Dec. 13, 1966  N. D. REMY ETAL  3,291,074
TRAILER HITCH FOR FLAT CARS
Filed Dec. 14, 1964  3 Sheets-Sheet 1
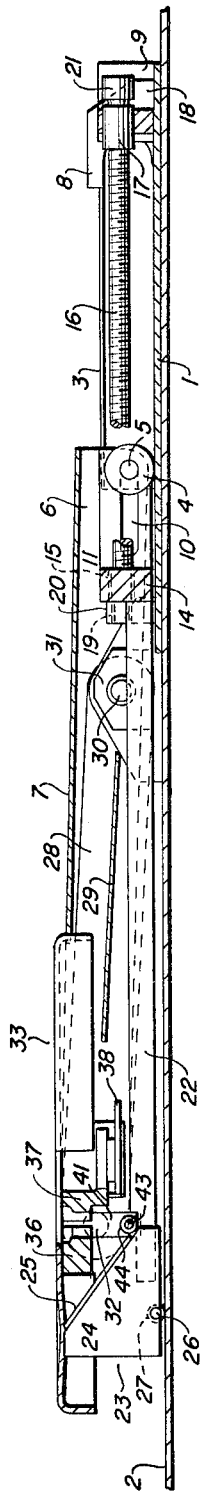
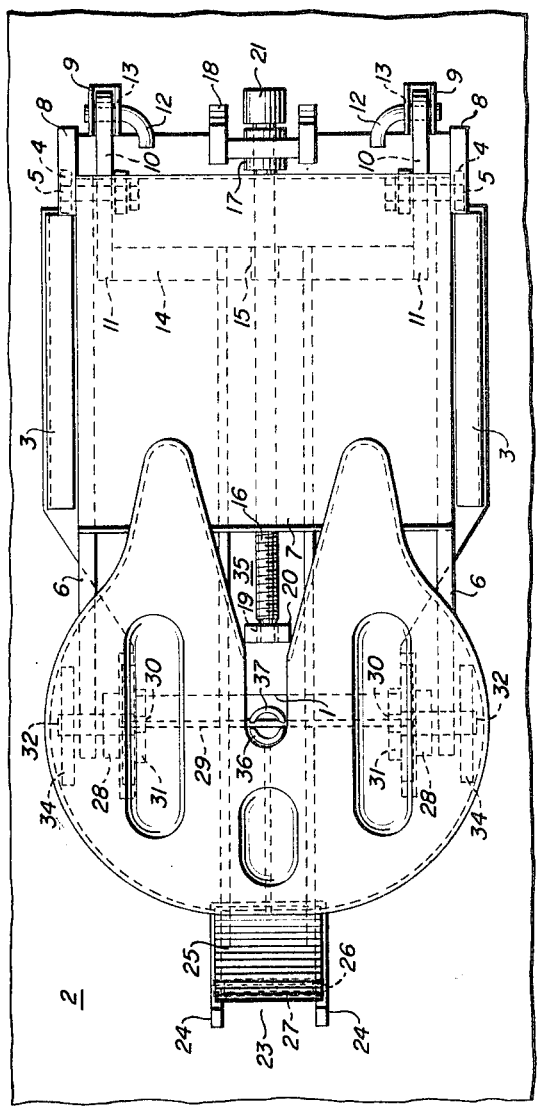
INVENTORS
Nicholas D. Remy
George J. Weiss Dec. 13, 1966     N. D. REMY ETAL     3,291,074
TRAILER HITCH FOR FLAT CARS Filed Dec. 14, 1964     3 Sheets-Sheet 2

INVENTORS
Nicholas D. Remy
George J. Weiss

Dec. 13, 1966  N. D. REMY ETAL  3,291,074
TRAILER HITCH FOR FLAT CARS
Filed Dec. 14, 1964  3 Sheets-Sheet 3
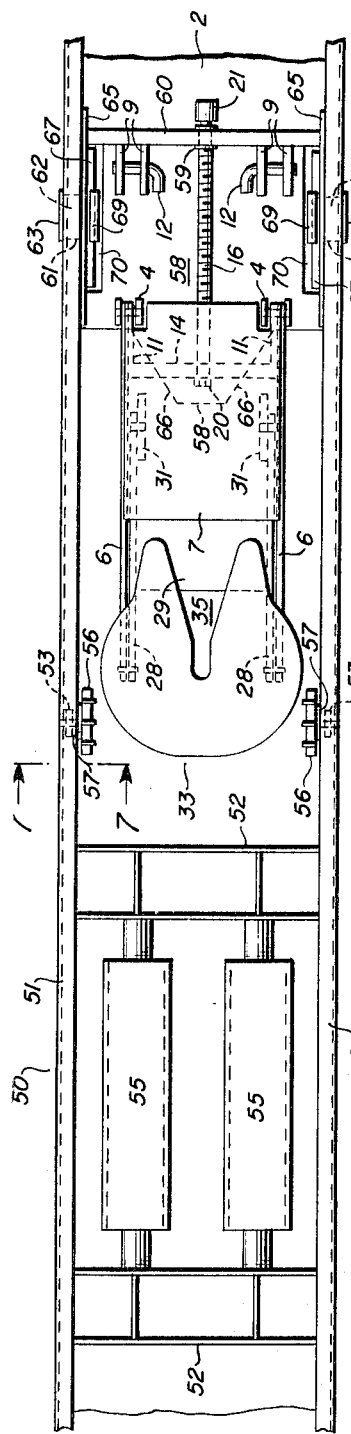
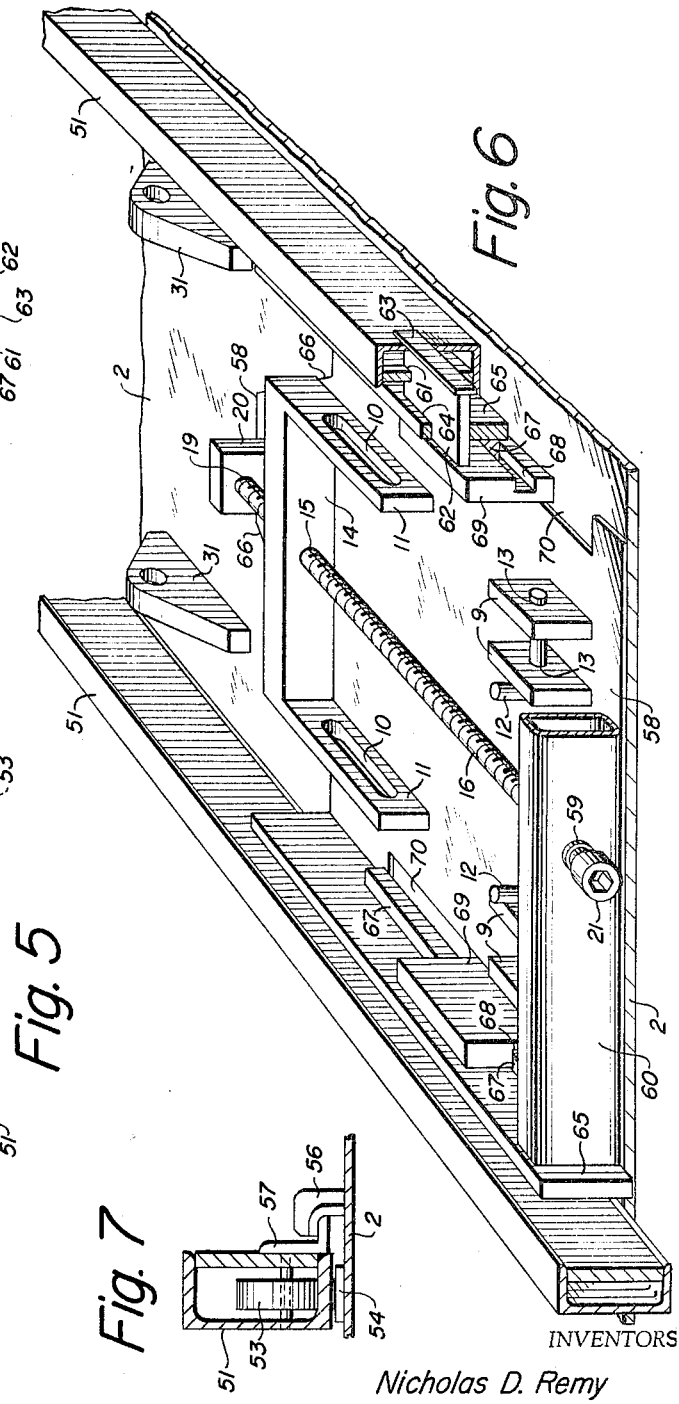
INVENTORS
Nicholas D. Remy
George J. Weiss

United States Patent Office 3,291,074
Patented Dec. 13, 1966

3,291,074
TRAILER HITCH FOR FLAT CARS
Nicholas D. Remy, Zionsville, and George J. Weiss, Bethlehem, Pa., assignors to Bethlehem Steel Company, a corporation of Pennsylvania
Filed Dec. 14, 1964, Ser. No. 417,909
1 Claim. (Cl. 105—368)

This invention relates to a device for securing a trailer on the deck of a railway flat car or a ship, and more particularly to a trailer hitch which is retractable thereon.

For efficient service on a flat car, for example, a trailer hitch should be collapsible in order to permit tractors and trailers to pass over them safely while the trailers are being loaded or unloaded endwise over the deck of the car. The hitch must thereafter be rapidly elevatable into service position, in which clamping means or a so-called "fifth wheel plate" thereon will hold the trailer firmly by its king-pin until released.

It is well known in the art to provide such a hitch which in the raised position comprises a vertical leg and a diagonal leg, one or both of which may have their lower ends pivotally mounted on a base plate and their upper ends pivotally connected together and supporting a fifth wheel plate.

One mechanism for raising or lowering such a hitch is a nut connected to a leg, which nut is in threaded engagement with a long drive screw. A major objection to this arrangement is the extremely high torque which is required to rotate the elevating screw during the initial raising of the hitch from the car floor. Springs to assist in the initial lift have been used, but these are not entirely satisfactory.

One object of this invention is to provide a trailer hitch of the above type which may be raised to erect position by an economical expenditure of power.

Another object is to provide efficient lifting means for the step of initial elevation of such a hitch.

Still another object is to provide movable wedge means which in the initial elevation of a hitch are adapted to assist the action of a drive screw.

A further object is to provide a hitch which is fully compatible with a cushioned container rack.

Still other objects, purposes and advantages of this invention will appear hereinafter in the specification and claim, and in the appended drawings.

In the drawings:

FIGURE 1 is a partly broken side elevation of the hitch shown in collapsed position;

FIG. 2 is a top plan view of the fully erected hitch;

FIG. 3 is a rear elevation of said erected hitch;

FIG. 4 is a partly broken side elevation of said erected hitch;

FIG. 5 is a top plan view of a modification of said hitch shown in collapsed position and having its base plate attached to a container rack;

FIG. 6 is a perspective view with parts removed illustrating the means attaching the base plate of said modified hitch to said container rack; and FIG. 7 is a detail view on the line 7—7 of FIG. 5.

Referring more particularly to FIGS. 1–4 of the drawings, the trailer hitch comprises a base plate 1 which is suitably supported on the deck 2 of a flat car or other vehicle. In said drawings, the front end of the base plate is to the right, and the rear end to the left. On opposite sides of the forward portion of said base plate are mounted the upwardly extending angle iron retainers 3, which serve as guides for pairs of rollers 4 on shafts or pivot pins 5 on which are mounted the lower ends of the first or forward pair of legs 6 provided with a cover plate 7. When said legs 6 are drawn forward and fully raised to the diagonal position shown in FIGS. 2 and 4, said rollers 4 will engage recessed stops 8 in proximity to the forward latches 9 on the base plate.

The pivot pins 5 extend through the longitudinally slotted holes 10 of a pair of lost-motion links 11, and removable locking pins 12 may be inserted through the forward portions of said holes 10 and registering holes 13 in the latches 9 to secure the hitch when raised.

The rear ends of links 11 are secured to a cross-member 14 having a drilled and tapped central hole 15. Said hole 15 engages a threaded shaft or drive screw 16. The forward end of the screw 16 is rotatably carried in a bearing 17 in a bracket 18 mounted on the base plate 1, and the rear end of the screw is seated in a bearing 19 in another bracket 20. The forward end of the screw 16 is fitted wtih a conventional wrench-engaging socket 21.

Extending rearwardly from said cross-member 14 is a pair of parallel pull rods 22 to the ends of which is attached a movable hollow wedge 23 comprising triangular side plates 24 and an inclined top plate 25 and a rod 26. On rod 26 a pipe 27 is mounted to serve as a roller permitting the wedge to be advanced over the deck 2 as the screw 16 is rotated.

The lower ends of the second pair of legs 28, which legs are connected by a web plate 29 and are in vertical position when fully raised, are pivotally mounted by pins 30 in the rear pivot brackets 31, which brackets 31 are secured to the deck 2 and/or base plate 1.

The upper ends of both pairs of legs 6 and 28 are pivotally connected together by the pins 32. Said pins 32 also serve to mount the trailer engaging head or fifth wheel plate 33 on its pairs of depending flanges 34. This head 33 is an inverted pan-shaped member having a V-shaped opening 35 to receive the trailer king-pin (not shown). Said head 33 is also conventionally provided with a fixed jaw 36 and a movable jaw 37 to grip the trailer pin. The latter jaw 37 may be controlled by a conventional pivoted lever arm 38.

On the underside of the head 33 are mounted a pair of laterally spaced depending brackets 41 and 42. See FIGS. 1 and 3. Said brackets 41 and 42 are connected together by a short transverse rod 43. Said rod 43 serves as a shaft or axle for a hollow roller 44 beneath the head 33.

The height, slope, initial location and range of travel of the wedge 23 in relation to the head 33 should of course be so correlated as to provide a sufficiently low collapsed position for proper clearance prior to lifting, and also to provide the desired height and rate of initial lift with a reasonably low and uniform starting torque on the drive-screw 16.

In operation, the trailer (not shown) is backed over the collapsed hitch until the trailer king-pin is in approximately the desired position over the head, and the trailer will be permitted to rest on its dolly wheels (also not shown). The initial rotation of the drive-screw 16 in the tapped hole 15 will begin the lifting movement of the hitch by causing the cross-member 14 and pull rods 22 to advance the upwardly inclined surface of the wedge 23 under the roller 44 upon which the head 33 is supported. When the advance of the wedge 23 has lifted the head 33 to approximately the full height the wedge, the forward ends of the lost-motion slotted holes 10 will become engaged by the pivot pins 5. Continued rotation of the drive-screw 16 will then take over the remaining portion of the lifting function by pulling forward the diagonal legs 6 until the legs 28 are substantially vertical. The rollers 4 will then be seated in the recessed stop 8, the locking pins 12 will be inserted through holes 10 into holes 13 in the latches 9, and the hitch will be fully elevated and secured in the operative position shown in FIG. 4.

The movable wedge 23 thus supplies the initial requirement for lifting power, and the lost-motion arrangement permits the initial lift of the head to be substantially completed before the forward pull on the diagonal legs 6 undertakes the final erection of the legs 28 to vertical.

When the railway car on which the hitch is mounted is equipped with long-travel draft-gears, it will normally be unnecessary for the hitch to be additionally cushioned. The base plate (or even the hitch itself without a base plate) may then be directly fastened to the car deck by welding or the like. However, where the draft-gears may be inadequately cushioned, and a cushioned rack adjacent the hitch or hitches is provided for the alternative carriage of containers, it is entirely safe and economical to use the cushioning of the rack for erected hitches when their vertical legs 28 are pivotally mounted on the deck 2 and the diagonal legs 6 are mounted on a cutaway base plate adapted to float or slide in unison with the rack members.

Such a cushioned rack is conventionally a welded rectangular frame 50 extending longitudinally of the car and comprising a pair of parallel upright side members 51 (which may consist of joined channels and flat bars) connected together in spaced relation by cross-members 52. Said frame is mounted on wheels (or skids) 53 on flat bar rails 54 and is permitted a limited amount of longitudinal buffing displacement on the car deck 2 by sets of standard sandwich-type rubber pads (such as "Waughmats") 55 operatively connected between the deck and the rack. Hook clips 56 attached to the car deck 2 serve as guides and retainers for the inner angles 57 on the side members of the frame, on which a plurality of removable cross bolsters (not shown) may support one or more large containers. This frame will straddle the trailer hitches, and may itself be straddled by tractors and trailers after the removal of obstructing cross-bolsters.

In the form of the invention shown in FIGS. 5-7, the diagonal legs 6 of each hitch are supported on a sliding base plate 58 (shown in FIG. 5 partly in dotted lines) resting on the deck 2 between the spaced side members 51 of the rack frame, with the forward end of the hitch lifting screw 16 extending through bearings 59 in a boss-shaped welded header or cross-member 60 on said base plate 58. Said rack side-members 51 are provided with longitudinal slots 61 through which are inserted closely-fitting flat locking bars 62 with enlarged head portions 63. Said longitudinal locking bars 62 engage in registering slots 64 in the upright side members 65 on the sliding base plate 58 of the hitch, when it is desired to have the rack cushioning serve also for the head 33 of the hitch. The sides of the rear end of said base plate 58 are cut away as at 66 to allow clearance for the brackets 31 of the hitch.

Said side members 65 are welded to the base plate 58 and are provided on their inner sides with flanges or projections 67. Said projections 67 engage in mating recesses 68 in the upper portions of upright hold-down members 69.

The later members 69 are welded to the underlying car deck 2 and project upwardly through elongated spaced parallel longitudinal slots or recesses 70 in the base plate 58 adjacent the slide members 65 so as to allow a limited amount of fore and aft sliding movement of the base plate 58 with the rack cushioning motion.

When the hitch is fully erect and operative, the buffing forces from the trailer will then be transmitted by the head 33 through the diagonal legs 6 to the rack side members 51 and thence through the shock absorber 55 to the car deck 2.

While this invention has been described hereinabove in considerable detail, it will of course be obvious to persons skilled in the art that other modifications, substitutions and equivalents may be utilized without departing from the scope and spirit of the claim hereto.

We claim:

In a trailer hitch having a base, a rearward leg disposed uprightly when in operative position, a forward leg inclined at an angle relative to said rearward leg when in operative position, said legs being pivotally connected adjacent their upper portions, a trailer engaging platform pivotally supported by said legs, the lower end of one of said legs being pivotally fixed to said base, the lower end of the other leg being longitudinally movable along said base, the improved means for raising and lowering the upper portions of said legs to raise and lower said platform between a collapsed lowered inoperative position permitting longitudinal movement of a highway trailer thereover and an operative raised position supporting one end of a highway trailer comprising:

(a) a screw rotatably attached to said base,
(b) a wedge operatively connected to the screw and adapted, on initial rotation of the screw, to engage the hitch in the area of said upper portion of said legs and elevate the platform, and
(c) a lost motion linkage operatively connected to the screw and the lower end of the other leg and adapted, on further rotation of the screw, to move the lower end of said other leg longitudinally along the base to further elevate the platform.

References Cited by the Examiner

UNITED STATES PATENTS

| | | | |
|---|---|---|---|
| 3,087,748 | 4/1963 | Livelsberger et al. | 105—368 X |
| 3,142,466 | 7/1964 | Gutridge et al. | 248—119 |
| 3,143,083 | 8/1964 | Gutridge et al. | 105—368 |
| 3,145,006 | 8/1964 | Robinson et al. | 248—119 |
| 3,168,878 | 2/1965 | Clejan | 105—368 |
| 3,189,306 | 6/1965 | Knippel | 248—119 |

DRAYTON E. HOFFMAN, *Examiner.*

ARTHUR L. LA POINT, *Primary Examiner.*